United States Patent [19]
Mead

[11] Patent Number: 6,041,147
[45] Date of Patent: *Mar. 21, 2000

[54] CONTENT-BASED INDEXING OF IMAGES BY CODING LEVELS DEFINED AS A FUNCTION OF REDUCED ENTROPY

[75] Inventor: Donald C. Mead, Carlsbad, Calif.

[73] Assignee: Hughes Electronics Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/732,803

[22] Filed: Oct. 15, 1996

[51] Int. Cl.[7] .............................. G06K 9/54; G06K 9/60
[52] U.S. Cl. .............................................. 382/305; 382/240
[58] Field of Search ...................................... 382/234, 236, 382/239, 240, 248, 305; 358/261.2, 430, 403; 348/394, 398, 404, 405, 408, 410, 411, 412, 415, 437, 438; 707/1, 2, 3, 5, 6

[56] References Cited

U.S. PATENT DOCUMENTS

| | | | |
|---|---|---|---|
| 5,073,821 | 12/1991 | Juri | 358/133 |
| 5,339,368 | 8/1994 | Higgins-Luthman et al. | 382/239 |
| 5,386,103 | 1/1995 | DeBan et al. | 235/379 |
| 5,390,258 | 2/1995 | Levin | 382/131 |
| 5,394,190 | 2/1995 | Yamada | 348/411 |
| 5,432,864 | 7/1995 | Lu et al. | 382/118 |
| 5,490,233 | 2/1996 | Kovacevic | 382/190 |
| 5,500,689 | 3/1996 | Lam | 348/699 |
| 5,602,589 | 2/1997 | Vishwanath et al. | 382/240 |
| 5,604,824 | 2/1997 | Chui et al. | 382/248 |
| 5,606,655 | 2/1997 | Arman et al. | 345/440 |
| 5,633,684 | 5/1997 | Teranishi et al. | 348/398 |
| 5,710,833 | 1/1998 | Moghaddam et al. | 382/118 |

*Primary Examiner*—Amelia Au
*Assistant Examiner*—Timothy M. Johnson
*Attorney, Agent, or Firm*—John A. Crook; Michael W. Sales

[57] ABSTRACT

A video image indexing system includes a method for identifying categories in compressed digital data for improved retrieval of video images. An encoder receives a frame and digitizes the image data while a sub-band coder codes each digitized frame at a plurality of transform levels to derive categorized data segments. Data segments are stored and then retrieved according to minimum entropy of Eigenvalues in a first transform level. Preferably, the compression is improved by creating a residual image of each frame by subtracting a predicted frame image from the actual frame image. This compression of data enhances the recreation of lossless video images at the receiver.

12 Claims, 1 Drawing Sheet

CONTENT-BASED INDEXING OF IMAGES BY CODING LEVELS DEFINED AS A FUNCTION OF REDUCED ENTROPY

TECHNICAL FIELD

The present invention relates to moving picture frame, video frame and still frame image storage and transmission and to the encoding of digital information filtered to compress data in a manner for prioritized retrieval, transmission, and reception.

BACKGROUND ART

It has previously been difficult to identify and retrieve selected moving picture, video or still images from a collection of image frames without human viewing of each of the frames to determine its content. As a result, retrieval of such images can be extremely time-consuming.

Another alternative is that the collection of images can be reviewed and provided with hand annotated designations as to the content of the images. However, the annotations must be entered on another media and further complicates the indexing of the data already accumulated in the images.

Moreover, while previous compression techniques can compress the image data, the compression techniques are often unrelated to the contents of the images and thus may not maximize the compression of the data. As a result, the compression does not minimize the storage or provide any information about content.

SUMMARY OF THE INVENTION

The present invention overcomes some of the above-mentioned disadvantages by providing an identification of accumulated data in storage for reaccessing the images by content. The present invention indexes the accumulated data by processing the data in a compression filter that employs a set of basis functions which minimize the entropy of the resulting generalized Eigenvalues during compression of the data. This filtering also provides the most effective compression of the data.

In the preferred embodiment, the data is prioritized by characteristic spatial frequencies. For example, since cloud images viewed from space have very characteristic spatial frequencies, an image that is compressed with a set of basis functions and optimized for compressing clouds will have a pattern of Eigenvalues with most of the energy concentrated in a small number. Accordingly, that characteristic set of Eigenvalues may be used to retrieve, transmit and receive non-cloud-covered aerial photographs without prolonged review of each frame image or the separate media annotations that identify such photographs.

As a result, the present invention provides the ability to browse databases for general subject matter content rather than imposing a complete review of the database. Moreover, only relevant identifying information need be reviewed, and does not require that the entire collection be reviewed in the order that it has been accumulated or transmitted. In addition, filtering according to the present invention improves compression of the data since it relates particularly to content of the images.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
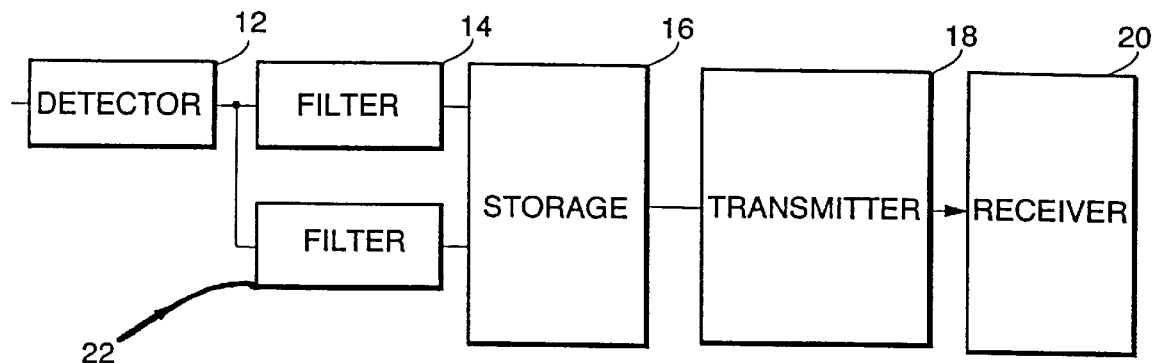
FIG. 1 is a block diagram of a communication system with an encoder for a vision transmission system according to the present invention.

Referring first to FIG. 1, the transmission system 10 according to the present invention performs a method for indexing video images by content by prioritizing the compression of content according to a reduced entropy of resulting Eigenvalues. The system permits browsing of the image content accumulated, retrieved, transmitted or received. Thus, the output of the image detector 12 is processed at a filter 14, preferably in the form of a hierarchical sub-band coder, to transform each of the images and categorize the data.

The categorized data is stored in a storage device 16 and selectively retrieved according to its content. Accordingly, the transmitter can then send selected data to a receiver 20, initially providing images that match a category which contains the desired content in each image. Moreover, an optimized compression of the accumulated image data can be obtained. Accordingly, the invention minimizes storage requirements and transmission time.

In addition, improved resolution transmission of image data can be obtained by employing a predictor 22 to create residual images that are calculated and stored for recreation of the high resolution images regardless of losses occurring in the compressed images. The stored or transmitted image data is compared with the actual image and subtracted to produce a residual image that can then be coded and stored for re-creating a lossless image. As a result, this reliance on a priori knowledge, as well as calculation and determination of the best of the basis functions and quantization methods in the compression process of the original frame, preferably simultaneously with the sub-band coding minimizes the number of bits required to represent the image losslessly. The coding and quantizing at filter 14 is preferably done at the same time as residual images are created at the predictor 22.

Figure 2:
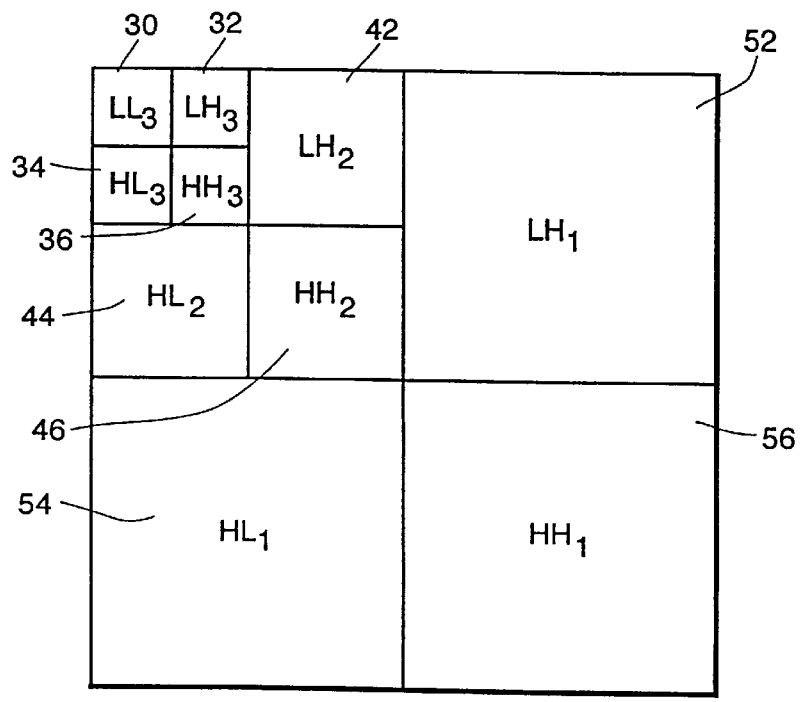
FIG. 2 is a diagrammatic view of the sub-band decomposition used in a filter in the system of FIG. 1.

Referring now to FIG. 2, the filter of the preferred embodiment includes a three-level Mallat sub-band decomposition of the image signal. This image compression performs multi-resolution decomposition using a wavelet transform on the original image. By so processing the signal, the energy and information in the image is redistributed into a small number of coefficients, which can be represented by fewer bits and subsequently provide data compression and compaction.

The wavelet transform maps the original image into a set of orthogonal subimages. The transform decomposes the original image at different resolutions using a pyramidal algorithm architecture, as shown in FIG. 2. The decomposition on images is along the vertical and horizontal directions and entails filtering and then decimating appropriately. Since most natural images tend to have a high correlation amongst nearby pixels, most of the energy in these natural images are found in the low frequency subimages. Relatively little energy is contained in the high frequency regions after the multi-resolution analysis.

As a result, most of the energy would reside in the LL3 subimage 30 containing the low frequency horizontal, low frequency vertical subimage at resolution level 3. Little energy would reside in the LH1 subimage 52 containing the low frequency horizontal, high frequency vertical subimage at resolution level 1, the HL1 subimage 54 that contains the high frequency horizontal, low frequency vertical subimage at resolution level 1, and HH1 subimage 56 containing the high frequency horizontal, high frequency vertical subimage at resolution level 1.

Indexing of the image data is based on which basis functions require the least number of bits to represent the image and the resulting generalized Eigenvalues for that set of basis functions. Retention of residual images permits lossless reconstruction of the original image with substantially less image data than previously known compression systems.

As a result, the present invention provides a method for indexing lossless images. The invention reduces the time for identification as well as storage or transmission of the desired images. Thus, the present invention calculates and determines the best set of basis functions and quantization method in the compression process so as to minimize the data required to represent the image and to identify the image by relevant content.

Having thus described the present invention, many modifications thereto will become apparent to those skilled in the art to which it pertains without departing from the scope and spirit of the present invention as defined in the appended claims.

What is claimed is:

1. A method for indexing image features of accumulated images in an image archival system, comprising:

receiving an image frame and digitizing the image;

sub-band coding each digitized frame at a plurality of transform levels defined as a function of reduced entropy to derive categorized data segments;

storing said categorized data segments; and indexing by retrieving selected data segments of video frames with the image features selected according to image content of the segment, the selection corresponding to a first transform level of said categorized data segments derived from said plurality of transform levels defined as a function of reduced entropy.

2. The invention as defined in claim 1 wherein said sub-band coding comprises wavelet filtering.

3. The invention as defined in claim 1 wherein said sub-band coding comprises quadrative mirror filtering.

4. The invention as defined in claim 1 and further comprising receiving a subsequent sensed frame, predicting a subsequent predicted frame from said frame, and subtracting said predicted subsequent frame from said subsequent sensed frame to obtain a residual image.

5. The invention as defined in claim 4 and further comprising losslessly coding said residual image and storing said image.

6. The invention as in claim 1 wherein said coding comprises transforming the image with a plurality of different basis functions and selecting a set of basis functions requiring the fewest bits to represent the image.

7. The invention as in claim 1 wherein said coding comprises quantizing the image at a plurality of quantization levels and coding the residual image.

8. The invention as described in claim 7 and selecting the quantization level which minimizes the number of bits required to represent the image.

9. The invention as defined in claim 8 wherein said image comprises a sequence of images.

10. The invention as in claim 8 wherein the steps of quantizing and selecting are interactively employed to create a global minimization of the number of bits required to represent the image.

11. The invention as defined in claim 1 and further comprising a decoder for decoding said categorized data segments and reconstructing the images with high resolution.

12. An image indexing system comprising:

indexing by retrieving a selected image feature in a class of compressed data images according to image content based on hierarchical compression transform basis functions, the function being selected as a function of identifying a reduced Eigenvalue pattern for said class;

viewing selected individual sub-images according to a low frequency sub-image content; and decoding a selected image by reversing the hierarchical compression, adding a residual image and displaying the resulting selected image as a lossless reproduction of said selected image.

* * * * *